United States Patent [19]

Wang

[11] Patent Number: 5,042,278
[45] Date of Patent: * Aug. 27, 1991

[54] AUTOMOBILE STEERING LOCK HAVING RODS ANTI-RELEASING MECHANISM

[76] Inventor: Song-Ming Wang, No. 61, Lane 668, Yuh-Nurng Rd., Tainan, Taiwan

[*] Notice: The portion of the term of this patent subsequent to Jun. 11, 2008 has been disclaimed.

[21] Appl. No.: 549,151

[22] Filed: Jul. 6, 1990

[51] Int. Cl.$^5$ .............................................. B60R 25/02
[52] U.S. Cl. .......................................... 70/209; 70/226
[58] Field of Search ................. 70/237, 238, 209, 211, 70/212, 225, 226

[56] References Cited

U.S. PATENT DOCUMENTS

| 4,531,388 | 7/1985 | Garro | 70/25 |
| 4,730,470 | 3/1988 | Zane et al. | 70/238 |
| 4,738,127 | 4/1988 | Johnson | 70/209 |
| 4,747,279 | 5/1988 | Solow | 70/211 X |
| 4,887,443 | 12/1989 | Wang | 70/226 X |
| 4,935,047 | 6/1990 | Wu | 70/238 X |

FOREIGN PATENT DOCUMENTS

| 1127524 | 9/1968 | United Kingdom | 70/226 |
| 2024307 | 1/1980 | United Kingdom | 70/238 |

Primary Examiner—Lloyd A. Gall
Attorney, Agent, or Firm—Morton J. Rosenberg; David I. Klein

[57] ABSTRACT

An antitheft device for attachment to a steering wheel of an automobile comprising an elongated body member having two parallel passageways extending along an axis therein, first hook means secured to the body member for engagement with a portion of the steering wheel wherein the first hook means engage the wheel from the inside thereof with the body member extending outward beyond the periphery of the steering wheel, a first elongated rod member adapted to move in telescopic fashion in one of the passageways of the body member along the axis, second hook means secured to the first rod member for engaging the inside portion of the steering wheel diametrically opposed to the first hook means, a second elongated rod member adapted to move in telescopic fashion in a direction reverse to the first rod member, and means associated with the body member engaging the rods within the passageways that allows the rod members to extend with respect to the body member to be locked at any of a plurality of positions and having means for engaging the rods from being released therefrom.

1 Claim, 6 Drawing Sheets

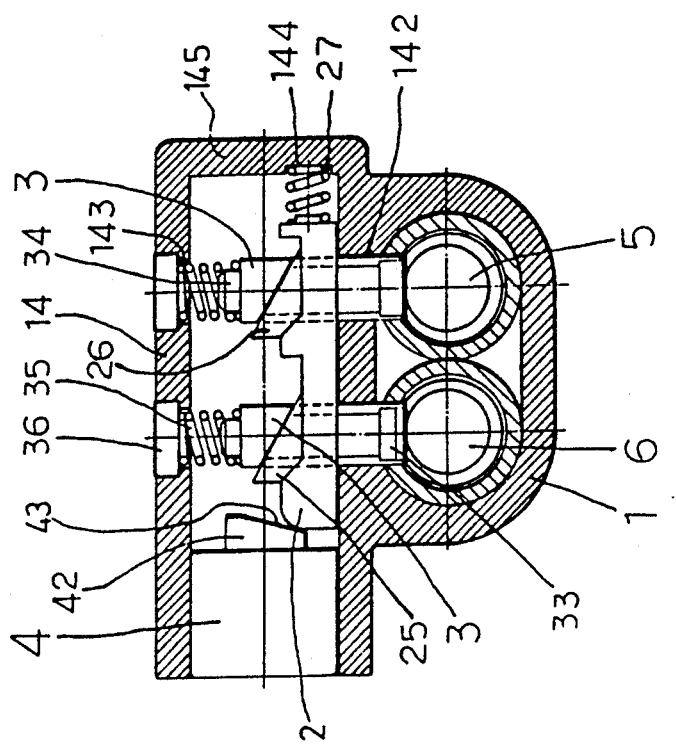
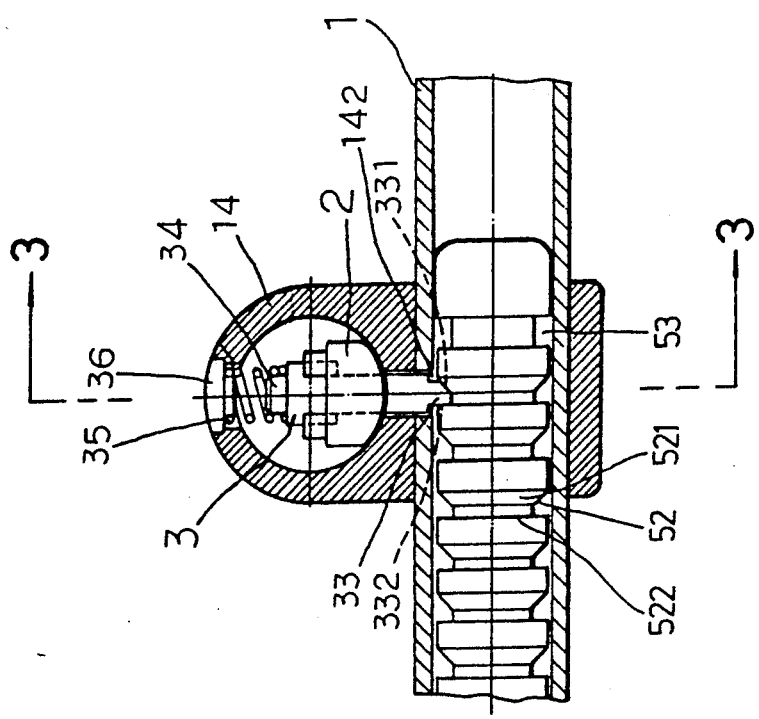

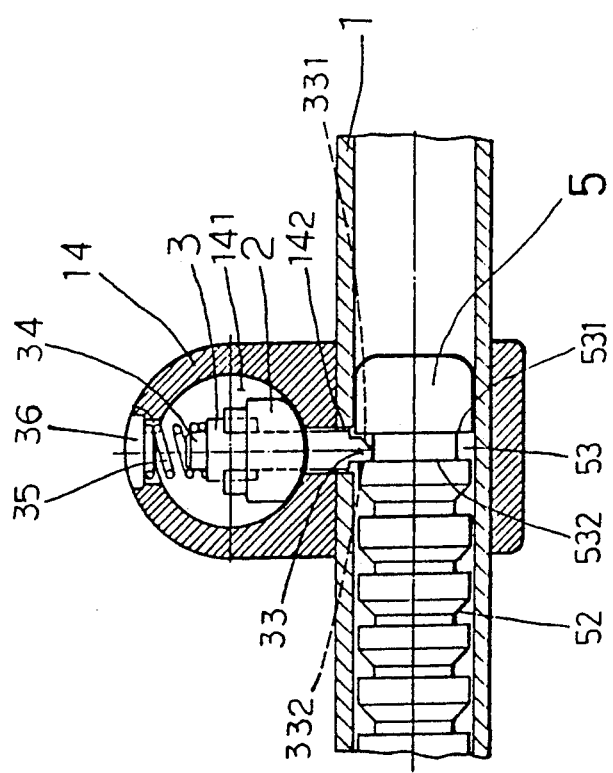
Fig. 2-A

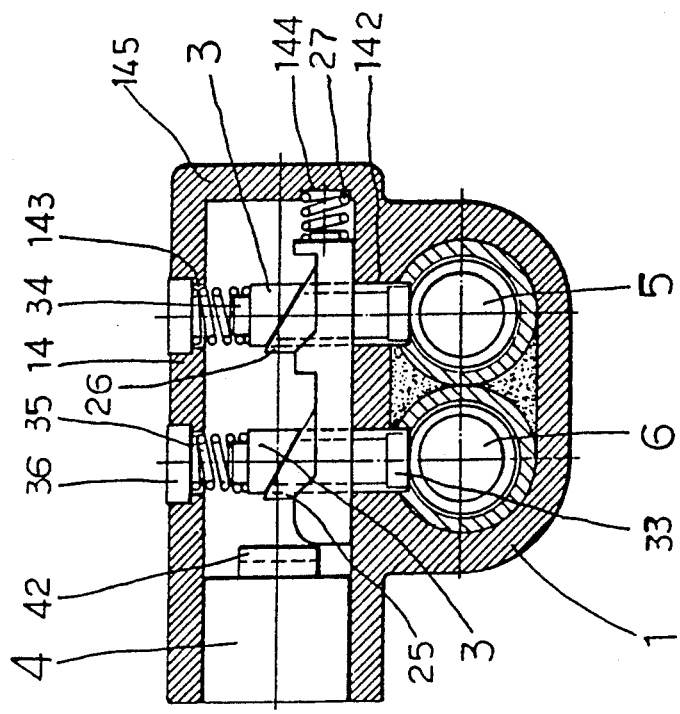
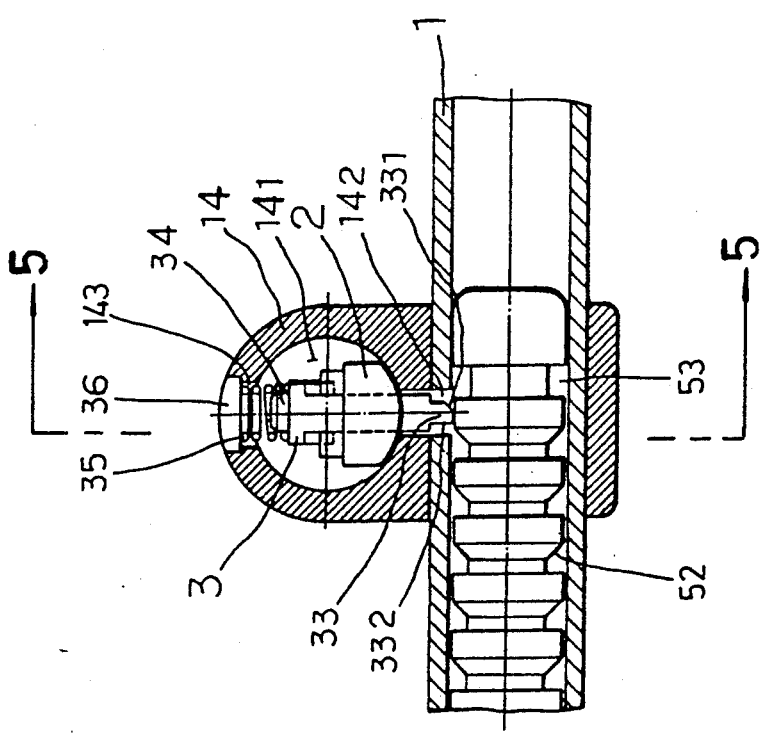
Fig. 4
Fig. 5

1

AUTOMOBILE STEERING LOCK HAVING RODS ANTI-RELEASING MECHANISM

FIELD OF THE INVENTION

The present invention relates to an automobile antitheft device, and more particularly to a device for attachment to an automobile steering wheel to prevent complete rotation thereof for securing against unauthorized driving.

BACKGROUND OF THE INVENTION

Antitheft device which attach to an automobile steering wheel have been known heretofore, as shown lately in U.S. Pat. No. 4,738,127 to Johnson. Such antitheft devices for attachment to a steering wheel of an automobile includes an elongated body member having a passage extending along an axis therethrough, an elongated rod member adapted to move in telescopic fashion in the passage way of the body member along the axis, opposed hooks for engaging the inside portion of the steering wheel and lock means associated with the body member engaging the rod within the passage for locking the rod within the passage for fixedly securing the rod to the body member at any of a plurality of positions. While the antitheft device described above is functional, it includes several defects. For example, both in and out of telescopic movements of the rod member there is needed a key to unlock the lock means. Another problem with such devices is that they provide pry points wherein a rigid pin or arcuate ruler-like thin objects can be inserted through a gap between the passage and periphery of the rod member to reach a spherical bearing of the lock means and further press it down by overcoming the bias force of a spring member thereon to release it from engaging the rod member in a groove thereof that renders an unlocking of the device.

It is accordingly a primary object of this invention to provide an automobile steering lock that overcomes the foregoing defects associated with the prior art.

Another object of this invention is to provide an automobile steering lock that performs a non-return, extension only function in the locking condition.

A further object of this invention is to provide a locking device wherein the locking mechanism is totally enclosed therein and includes no area susceptible to prying by a crowbar, rigid pin or the like.

A yet further object of this invention is to provide an automobile steering lock having a mechanism for preventing a rod member thereof from being released therefrom.

BRIEF DESCRIPTION OF THE DRAWINGS

FIG. 2 is a cross-sectional view of a housing, which is in a locking condition, illustrating a tenon end of a first rod-like bearing protruding into an annular groove in a first rod;

FIG. 2A is a cross-sectional view of the housing, which is in locking and engaging condition, illustrating the tenon end of the rod-like bearing protruding into a side annular groove in the first rod;

FIG. 3 is a cross-sectional view taken along line 3—3, of FIG. 2;

FIG. 4 is a cross-sectional view of the housing, which is in unlocking condition;

FIG. 5 is a cross-sectional view taken along line 5—5, of FIG. 4;

DETAILED DESCRIPTION OF A PREFERRED EMBODIMENT

Figure 1:
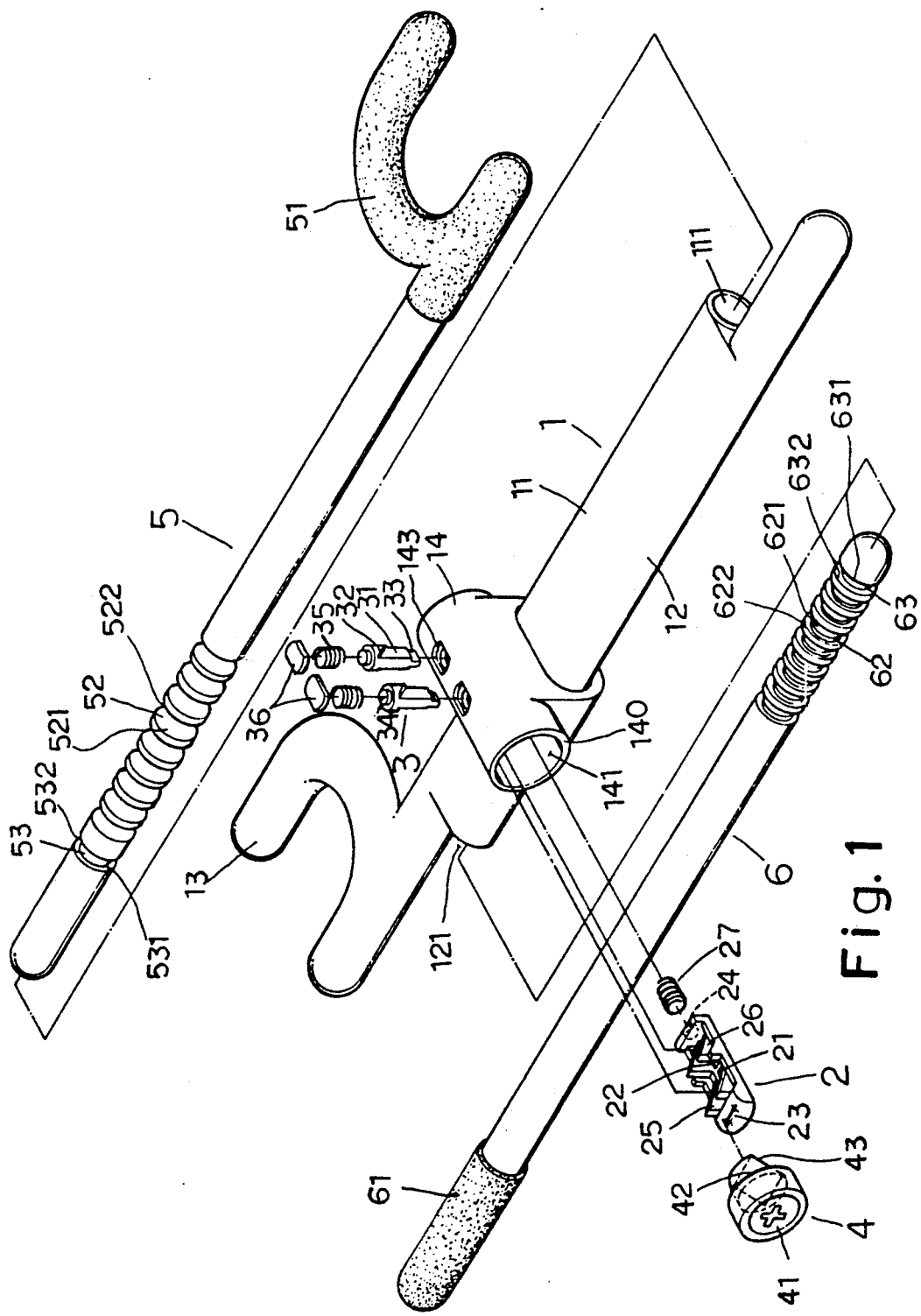
FIG. 1 is a perspective and exploded view of a preferred embodiment of the present invention.

Referring to FIG. 1, there is shown an automobile steering lock according to the present invention which comprises an elongated body member 1, a first elongated rod member 5 and a second elongated rod member 6 which are dimensioned to move in telescopic fashion within body member 1. Hooks 13, 51 for engaging opposed portions of a steering wheel from the inside thereof, being respectively provided on the body member 1 and first rod member 5. A housing 14 and a locking mechanism including a locking means 4, an actuating means 2 and a pair of locating means 3, are within the housing 14 to position and lock rod members 5 and 6 in a stationary position with respect to the body member 1 at one of a plurality of positions.

Body member 1 includes two parallel elongated tubes 11, 12 of circular cross-section having open ends 111, 121 and opposing closed ends defining respective central passages running respectively from the open ends to the closed ends. Openings 111, 121 of the body member 1 face in opposite directions so that the first and second rod members 5, 6 telescope in opposite directions with respect to each other in the body member 1.

Figure 8:
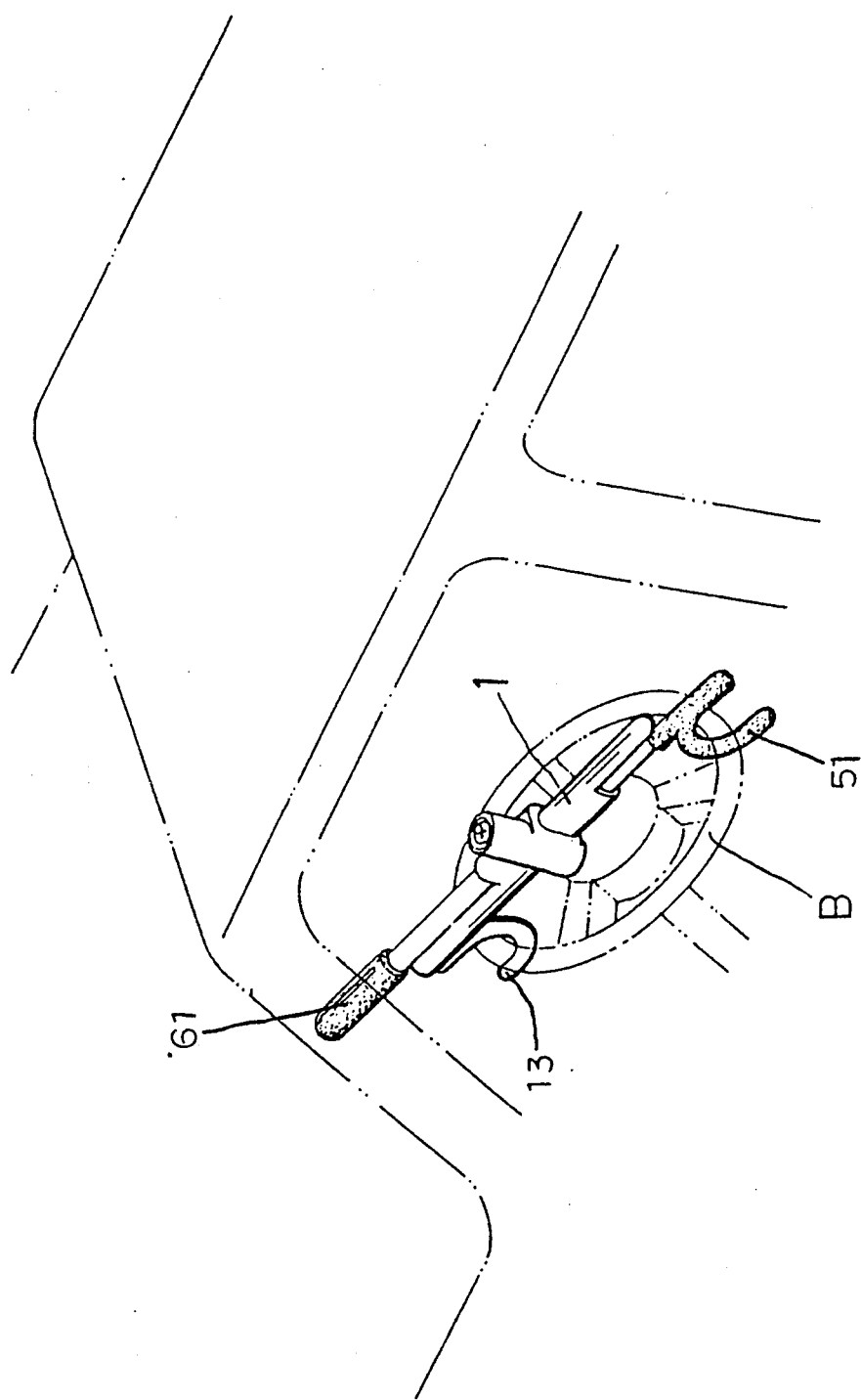
FIG. 8 is a diagramatically perspective view showing the steering lock of this invention locking on a steering wheel of a car.

The first generally U-shaped member 13 is fixedly secured to the tube 11 by welding to form a hook 13 which opens rearwardly along the body member 1. First rod member 5 is of circular cross-section of which the outer diameter is dimensioned slightly less than the diameter of the first passage in the first tube 11 of the body member 1 to enable first rod member 5 to telescope freely within the first tube 11. The second generally U-shaped member 51 is fixedly secured to the front end portion of the first rod member 5 to form a hook 51 which opens opposite to the hook 13 for engagement with a diametrically opposed portion of a steering wheel B, as best shown in FIG. 8. A plurality of annular grooves 52 are formed in rod member 5 and are axially aligned. Each of the grooves 52 includes a vertical side wall 522 substantially perpendicular to the longitudinal direction of first rod 5 and relatively close to the second hook 51. Additionally each groove 52 includes a convex or slope side wall 521 relatively distant from the second hook 51. A side annular groove 53 is circumferentially formed in an end portion opposite to the hooked end 51 of the first rod 5. Said side annular groove 53 consists of opposed vertical side walls 531, 532.

Second rod member 6 is of circular cross-section and the diameter is dimensioned to be slightly less than the diameter of the second passage in the second tube 12 of the body member 1 to enable second rod member 6 to telescope or be displaced freely within the second tube 12. A grip 61 is secured to the free end of the second rod 6. A plurality of annular grooves 62 identical to but opposingly located with respect to grooves 52 of the first rod 5 are axially aligned along second rod member 6. Each of the grooves 62 consists of a vertical side wall 622 located relatively close to the grip end 61 and a convex or slope side wall 621 located relatively far from the grip end 61. A side annular groove 63 is circumferentially formed in an end portion opposite to the grip end 61 of the second rod 6. Side annular groove 63 consists of opposed vertical side walls 631, 632.

The housing 14 is formed around a mid portion of the body member 1 to form an integral structure therewith wherein a central passage extends and contains the locking mechanism including the locking means 4, actuating means 2 and locating means 3.

The housing includes a boss 140 integrally offset with respect to the axes of the tubes 11, 12 of the body member 1 and having a bore 141 transversely extending into the housing 14 for firmly receiving the locking means 4 which has a conventional key lock 41 and a locking member 42 having a slanting end 43.

Figure 7:
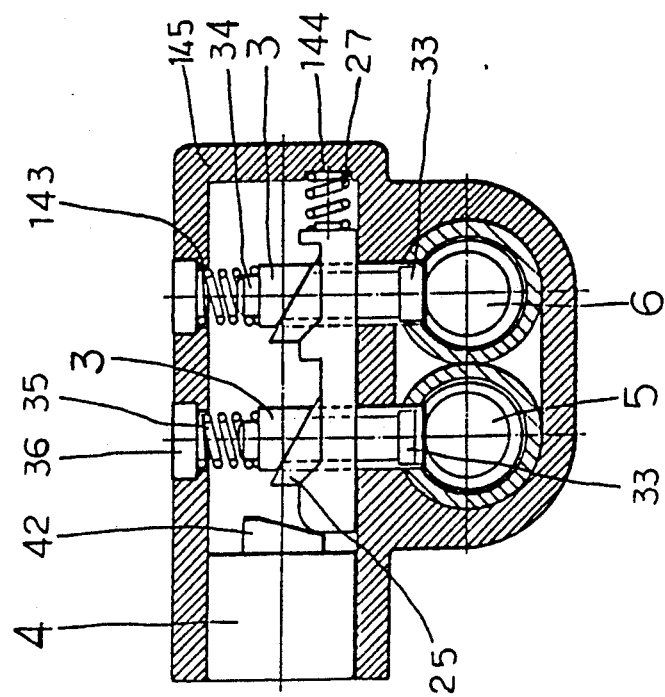
FIG. 7 is a cross-sectional view taken along line 7—7, of FIG. 6.

To accommodate the locating means 3, two vertical passages 142, as best shown in FIGS. 3, 5 and 7, are vertically bored in the housing 1. The vertical passages 142 intersect the bore 141 and the central passages of the tubes 11, 12 of the body member 1. Two top holes 143 in alignment with the vertical passages 142 are formed in an outer wall of the housing 14 to facilitate inserting the locating means 3.

The actuating means includes a substantially vessel-shaped actuating member 2 which is formed with an arcuate front wall 23, a rear wall externally formed with a projection 24 for retaining one end of a biasing spring 27, two slots 21, 22 located between two pairs of opposed ribs 25, 26 which serve as rails and are formed with inclined walls located on a side opposite the arcuate front wall 23.

Figure 6:
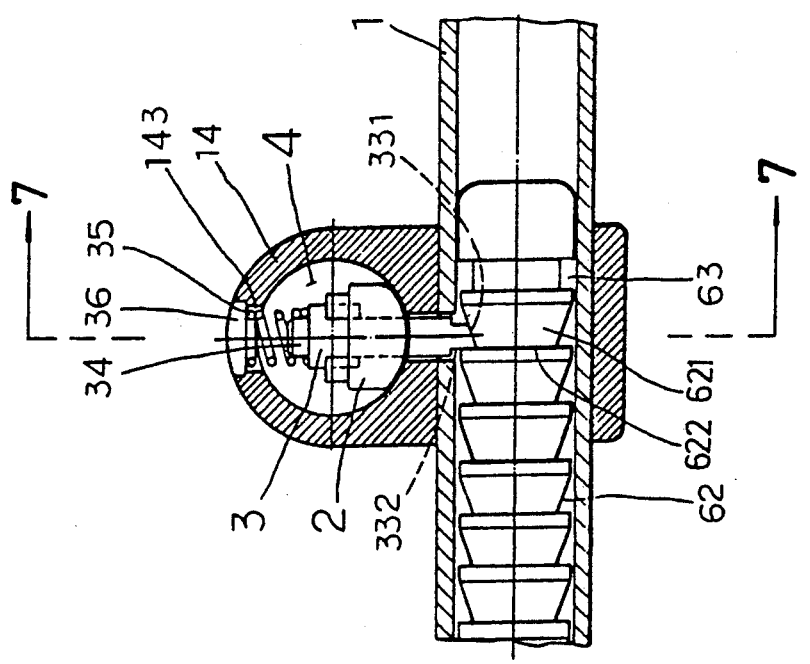
FIG. 6 is a cross-sectional view of the housing which is in locking condition, illustrating a tenon end of a second rod-like bearing protruding into an annular groove in a second rod.

The locating members 3 include rod-like bearings 31 having projections 34 on the top for receiving lower ends of biasing springs. The locating members are further defined by side surfaces 32 for mating engages with the rails 25, 26 of the actuating member 2, and tenon ends 33 defined with vertical surfaces 332 and slanting surfaces, as best shown in FIGS. 2, 4 and 6.

In assembly, as shown in FIGS. 2, 2A, 3, 4, 5, 6 and 7, the rod-like bearings 3 are inserted into the vertical passages 142 of the housing 14 through the openings 143 and slots 21, 22 of the actuating member 2. After installing the rod-like bearings 3, the openings 143 are closed with retainers 36 so as to maintain the bearings 31 and springs 35 in position. The springs 35 thus disposed normally bias the rod-like bearings 31 downwardly so that tenon ends 33 thereof engaging the grooves 52, 62 of the first and second rod members 5, 6. The spring 27 with the other end retained in a recess 144 formed in an inner surface of a rear wall 145 of the housing 14 normally biases the actuating member 2 towards the locking means 4.

In operation, when the slanting end surface 43 is oriented downwardly, as shown in FIGS. 2, 3 and 6, 7, that locates the actuating member 2 in its first position whereas the tenon ends of the first and second locating members 3 are positioned in a lower or first position and protrude into grooves 52, 62 to lock the device. Although in a locking condition, the convex or slope side walls 521, 621 of the grooves 52, 62 of the first and second rod members 5, 6 of this antitheft device provides extension of rod members 5, 6 in telescopic fashion with respect to the body member 1 in opposite directions with respect to each other by overcoming biasing forces of the spring members 35. However the vertical side walls 522 of the first rod member 5 and the vertical side walls 622 of the second rod member 6 abutting the vertical surfaces 332 of the tenon ends 33 of the rod-like bearings 3, prohibit the rod members 5, 6 from moving to collapse with respect to the body member 1. By so doing, as in locked state of the antitheft device of this invention, the first rod member 5 can be extended for engaging opposed portions of a steering wheel with hooks 13, 51 without a key to unlock the device. Furthermore, the second rod member 6 can also be extended into a dead corner between front wind shield and a side window of the car for restricting the steering wheel from complete rotation.

When the locking member 42 of the locking means 4 is rotated 180 degrees to a second position, the slanting end surface 43 of the locking member 42 forces the actuating member 2 to slide left into a second position by overcoming biasing force of the spring 27, as shown in FIGS. 4 & 5, the rod-like bearings 3 slide on the ribs 25, 26 by means of surfaces 32 thereof from their lower or first position into higher or second position along the up-going slopes and thus lifting the rod-like bearings 3 to release the tenon ends 33 thereof from corresponding grooves 52, 62. By so doing, the rod members 5, 6 can move in and out in telescopic fashion with respect to the body member 1.

There may be a problem that the rod members 5, 6 accidentally be released from the body member 1 by pulling the rod members 5, 6 too hard to extend them into a locking condition. Either of the rod members 5, 6 thus released may strike the wind shield of the car and break it or hit some one sitting nearby. The present invention provides a rods anti-releasing mechanism to prevent the rods 5, 6 from being released. As shown in FIG. 2A, with the rod member 5 used as an example, the anti-release function to the second rod 6 being the same as the function to the first rod 5. The end portion of the first rod 5 is circumferentially formed with an annular groove 53 which consists of opposed vertical side walls 531, 532. In the locking condition, under biasing force of the spring 35, the tenon end 33 of the rod-like bearing 3 automatically protrudes into the side annular groove 53 in the end portion of the first rod 5 as it is extended to its extremity. The tenon end 33 is confined between opposed vertical side walls 531, 532 of the side annular groove 53 to stop further extending movement of the first rod 5 thus preventing the first rod 5 from being released from the body member 1.

While the invention has been described with respect to preferred embodiment, it is obvious that various modifications can be made therein without departing from the spirit of present invention which should be limited only by the scope of the claim.

What is claimed is:

1. An antitheft device for attachment to a steering wheel of an automobile comprising:
an elongated body member integrally constituted with a first tubular member having an open end and a closed end and a first elongated passageway extending along its axis from the open end to the closed end and a second tubular member having an open end and a closed end and a second elongated passageway extending opposite to the first passageway along its axis from its open end to its closed end, said body member having a first hook defining an extension of said first tubular member on one end thereof, said first hook being U-shaped in contour having an upper leg portion forming an extension of said first tubular member providing said closed end and a bottom leg portion generally extending in the direction of said first tubular member's axis and terminating at a distance substantially removed from said closed end of said first tubular member, said first hook of said body member adapted to engage said steering wheel from the inside thereof with said closed end of said first tubular member extending a substantial distance beyond the periphery of said wheel;

a first elongated rod member having an inner end and an outer end, said inner end adapted to extend in a telescopic manner within said first passageway of said first tubular member of said body member, said outer end of said first rod member being formed into a generally U-shaped portion with the opening of said U-shaped portion at said outer end of said first rod member, said U-shaped portion of said first rod member adapted to engage said wheel from the inside thereof, said first rod member further including a plurality of spaced annular grooves, each being defined with a vertical side wall perpendicular to its axis and relatively close to its outer end and a convex or inclined side wall displaced from its outer end, disposed about a portion thereof, and a side annular groove consisting of opposed vertical side walls and circumferentially formed in an end portion of the first rod member opposite to its outer end;

a second elongated rod member having an inner end and an outer end, said outer end adapted to extend in a telescopic manner within said second passageway of said second tubular member of said body member, said second rod member further including a plurality of spaced annular grooves, each being defined with a vertical side wall perpendicular to its axis and displaced from its outer end and a convex or inclined side wall relatively close to its outer end, disposed about a portion thereof, and a side annular groove consisting of opposed vertical side walls and circumferentially formed in an end portion of the second rod member;

a housing integrally formed in a mid portion of the body member and having a passageway extending in a transverse direction to said first tubular member;

vertical passageways interconnecting the passageway in the housing and the passageways of the first and second tubular members;

a lock retained in the housing and having a locking member having an inner end formed with an inclined wall, a vessel-shaped actuating member slidably fitted in the passageway of the housing and formed with an arcuate front wall, a rear wall spaced from and opposed to the front wall and having means for retaining one end of a first spring which normally biases to push the actuating member toward the lock with the arcuate front wall of the actuating member abutting the inner end of the locking member, two slots corresponding to the vertical passageways and parallel rails sloping downwardly from said front wall towards said rear wall thereof;

rod-like bearings adapted to be inserted through said slots of the actuating member and vertical passageways with surfaces matingly engaging said parallel rails of the actuating member and tenon members attached to an end thereof and arranged to be actuated between a locking position with the tenon members protruding respectively into an annular groove or the side annular groove in the first rod member and an annular groove or the side annular groove in the second rod member and an unlocking position with the tenon members withdrawn from said grooves, and said surfaces slidably mating said parallel rails of the actuating member being controlled to position the tenon members in locking or unlocking position through the actuating member by means of the locking member; and, spring members mounted on the rod-like bearings and biasing the rod-like bearings towards the passageways in the tubular members.

* * * * *